United States Patent
Modawell et al.

(10) Patent No.: US 6,931,920 B2
(45) Date of Patent: Aug. 23, 2005

(54) TIRE MONITORING SYSTEM

(75) Inventors: Calvin Modawell, Troy, MI (US); Thomas J. LeMense, Farmington, MI (US); Keith Walker, Redford, MI (US)

(73) Assignee: Lear Corporation, Southfield, MI (US)

( * ) Notice: Subject to any disclaimer, the term of this patent is extended or adjusted under 35 U.S.C. 154(b) by 90 days.

(21) Appl. No.: 10/620,584

(22) Filed: Jul. 16, 2003

(65) Prior Publication Data

US 2005/0011257 A1 Jan. 20, 2005

(51) Int. Cl.[7] .............................................. G01M 17/02
(52) U.S. Cl. ........................ 73/146; 73/146.3; 73/146.5
(58) Field of Search ................ 73/700–756, 146–146.8; 340/440–447

(56) References Cited

U.S. PATENT DOCUMENTS

| | | | |
|---|---|---|---|
| 5,600,301 A | | 2/1997 | Robinson, III |
| 5,717,135 A | * | 2/1998 | Fiorletta et al. ............ 73/146.5 |
| 5,814,725 A | * | 9/1998 | Furuichi et al. ............ 73/146.5 |
| 5,838,229 A | | 11/1998 | Robinson, III |
| 5,844,131 A | | 12/1998 | Gabelmann et al. |
| 6,055,855 A | | 5/2000 | Straub |
| 6,181,241 B1 | | 1/2001 | Normann et al. |
| 6,446,502 B1 | | 9/2002 | Normann et al. |
| 2002/0171537 A1 | | 11/2002 | Ghabra et al. |
| 2003/0030553 A1 | | 2/2003 | Schofield et al. |
| 2003/0071723 A1 | | 4/2003 | Tang et al. |

* cited by examiner

Primary Examiner—William Oen
Assistant Examiner—Jermaine Jenkins
(74) Attorney, Agent, or Firm—Bill C. Panagos

(57) ABSTRACT

A tire monitoring system for a vehicle. The tire monitoring system includes a sensor assembly mountable on a wheel and has a first sensor for detecting a tire parameter and a second sensor for detecting proximity of the sensor assembly to the wheel. The sensor assembly is detached from the wheel when the second sensor is not proximate to the wheel.

20 Claims, 2 Drawing Sheets

TIRE MONITORING SYSTEM

BACKGROUND OF THE INVENTION

1. Field of the Invention

The present invention relates to a system for monitoring tire pressure and detecting detachment of a tire pressure sensor assembly from a vehicle wheel.

2. Background Art

Tire pressure monitoring systems are used to detect the pressure of vehicle tires. Pressure is detected using a pressure sensor configured to be attached to a vehicle wheel, such as on a tire inflator valve. Examples of prior attachment mechanisms are disclosed in U.S. Pat. Nos. 5,600,301, 5,844,131, and 6,055,844.

SUMMARY OF THE INVENTION

According to one aspect of the present invention, a vehicle tire monitoring system for use with a wheel configured to have a tire mounted thereon is provided. The tire monitoring system includes a sensor assembly mountable on the wheel. The sensor assembly includes a first sensor for detecting a tire parameter and a second sensor detecting proximity of the sensor assembly to the wheel. The second sensor, which may be a hall effect sensor, may detect detachment of the sensor assembly from the wheel when the second sensor is not positioned adjacent to a magnet.

The sensor assembly may be disposed on the wheel using an adhesive and may be positioned on a drop center portion of the wheel. The sensor assembly may include a bracket for positioning the second sensor relative to the magnet. The bracket may include an aperture located between the second sensor and the magnet. An insulator may be disposed between the magnet and the wheel to inhibit demagnetization. The first and second sensors may be mounted on a circuit board. A protective cover may be disposed around the first and second sensors.

According to another embodiment of the present invention, a vehicle tire monitoring system for use with a wheel configured to have a tire mounted thereon is provided. The tire monitoring system includes a sensor assembly mountable on the tire. The sensor assembly includes a first sensor for detecting a tire parameter and a second sensor detecting proximity of the sensor assembly to the tire. The second sensor, which may be a hall effect sensor, may detect detachment of the sensor assembly from the tire when the second sensor is not positioned adjacent to a magnet.

The sensor assembly may be disposed on the tire using an adhesive and may include a bracket for positioning the second sensor relative to the magnet. The bracket may include an aperture located between the second sensor and the magnet. The magnet may be disposed on the tire using an adhesive. The first and second sensors may be mounted on a circuit board. A protective cover may be disposed around the first and second sensors.

According to another aspect of the present invention, a system for monitoring pressure of a pneumatic tire disposed on a vehicle wheel is provided. The pneumatic tire and the vehicle wheel cooperate to define a chamber surface. A magnet and a sensor assembly are disposable on the chamber surface. The sensor assembly is disposable proximate to the magnet and includes a pressure sensor for sensing air pressure in the tire and an attachment sensor. The attachment sensor is configured to detect attachment of the sensor assembly to the chamber surface based on the position of the attachment sensor relative to the magnet.

DETAILED DESCRIPTION OF THE PREFERRED EMBODIMENT(S)

Figure 1:
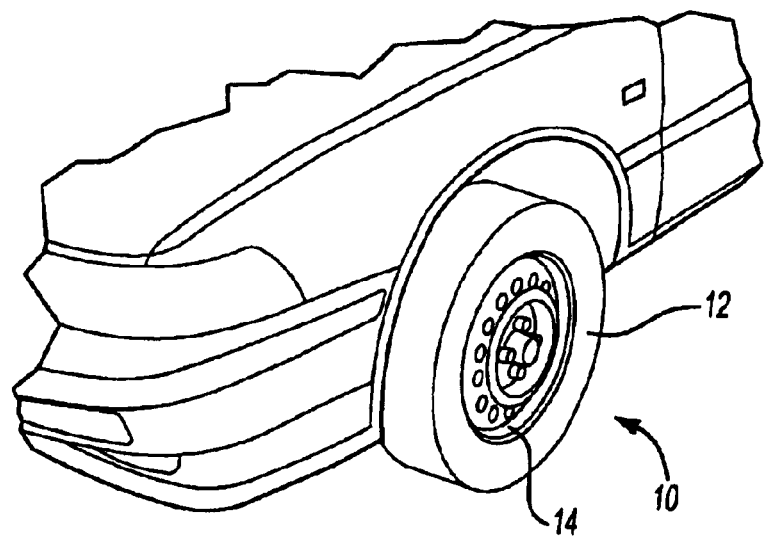
FIG. 1 is a schematic view of a tire and wheel assembly disposed on a vehicle.

Referring to FIG. 1, a tire and wheel assembly 10 is shown mounted on a vehicle. The tire and wheel assembly 10 includes a tire 12 disposed on a vehicle wheel 14. The tire 12 may have any suitable configuration, including a radial, bias ply, or bias-belted construction. The wheel 14 may also have any suitable configuration and may be made from various materials including steel, aluminum, magnesium, graphite, and/or various alloys. Multiple tire and wheel assemblies may be disposed on the vehicle.

Figure 2:
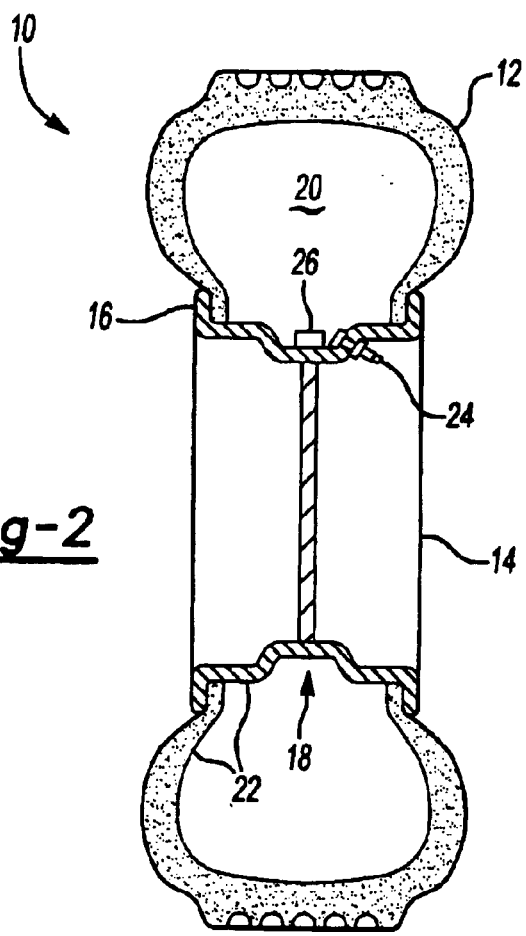
FIG. 2 is a cross section of the tire and wheel assembly having a tire monitoring system.

Referring to FIG. 2, a section view of the tire and wheel assembly 10 is shown. The wheel 14 includes a flange portion 16 and a drop well or drop center portion 18 disposed along its circumference. The drop center portion 18 is recessed below the flange portion 16 and may be located near the center of the wheel 14. The tire 12 is disposed on the wheel 14 in contact with the flange portion 16. A chamber 20 is formed between the tire 12 and the wheel 14. The chamber 20 is defined by a chamber surface 22 formed by the inner surface of the tire 12 and the circumference of the wheel 14. A valve 24 may be used to fill the chamber 20 with air.

Figure 3:
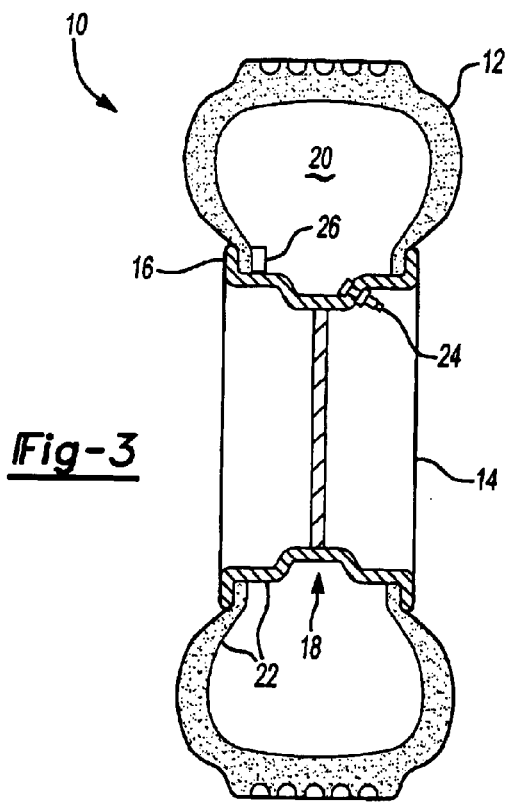
FIG. 3 is a cross section of another embodiment of the tire and wheel assembly having a tire monitoring system.

A sensor assembly 26 may be disposed on or proximate to the chamber surface 22 in any orientation and at any location where the sensor assembly 26 is exposed to air inside of the tire 12. For instance, the sensor assembly 26 may be disposed on the wheel 14 as shown in FIG. 2 or on the inner surface of the tire 12 as shown in FIG. 3. While the sensor assembly 26 is shown attached to the wheel 14 and the tire 12 in FIGS. 2 and 3, respectively, the sensor assembly could also be attached to the valve 24.

Figure 4:
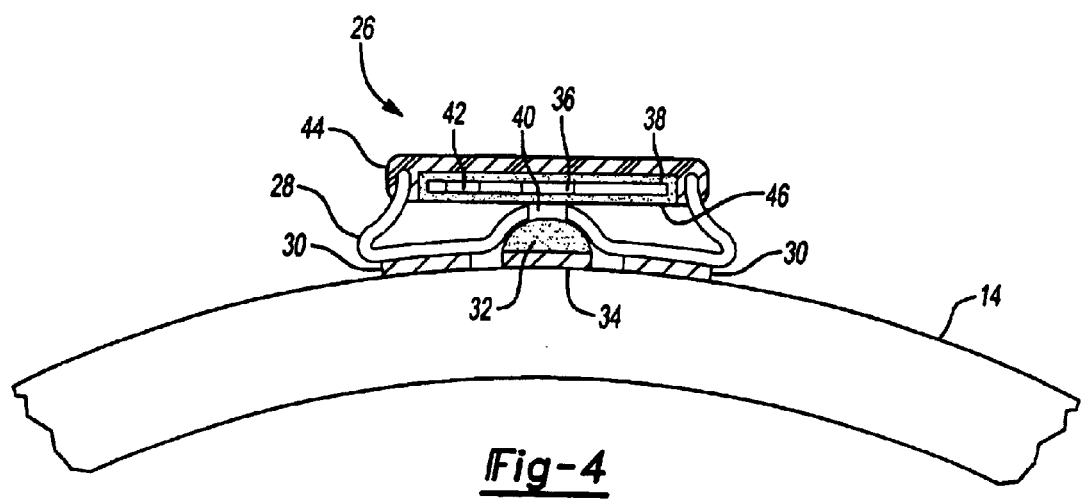
FIG. 4 is a side section view of a sensor assembly of the tire monitoring system.

Referring to FIG. 4, the sensor assembly 26 of FIG. 2 is shown in more detail. The sensor assembly 26 includes a bracket 28 that may be made of any suitable material such as metal or a polymeric material. The bracket 28 is attached to the wheel 14 using an adhesive 30, such as an adhesive pad with a peel off backing. Alternatively, the bracket 28 may be attached using a strap, welding, hook and loop fastening system such as Velcro®, fasteners, or any other suitable attachment means.

A magnet 32 is positioned between the bracket 28 and the wheel 14. The magnet 32 may be any magnetized material and can be oriented in any direction. The magnet 32 may be attached to the vehicle wheel using an adhesive, fasteners, magnetism, hook and loop fastening system such as Velcro®, welding, or any other suitable attachment means. Alternatively, the magnet 32 may be loosely positioned between the bracket 28 and the wheel 14.

An insulator 34 may be provided between the magnet 32 and the wheel 14 to inhibit demagnetization of the magnet 32, such as may occur if the magnet 32 contacts a steel wheel. The insulator 34 spaces the magnet 32 from the wheel 14 and may be an adhesive, foam, coating layer, or other suitable material. Optionally, an insulator or spacer may be disposed between the magnet 32 and the bracket 28. Alternatively, the magnet 32 may contact the bracket 28.

The sensor assembly 26 further includes an attachment sensor 36 positioned adjacent to the magnet 32. The attachment sensor 36 may be a hall effect sensor mounted on a circuit board 38. The attachment sensor 36 detects separation of the sensor assembly 26 from the wheel 14 by sensing the change in magnetic force when the sensor assembly 26 moves away from the magnet 32. Optionally, the bracket 28 may include an aperture 40 between the magnet 32 and the attachment sensor 36. The aperture 40 facilitates communication of the magnetic field between the magnet 32 and the attachment sensor 36. Alternatively, the attachment sensor 36 may be a proximity sensor that detects the proximity of the sensor assembly 26 to the chamber surface 22 without using a magnet. In addition, the attachment sensor 36 may be mounted to the chamber surface 22 rather than to the sensor assembly 26.

The circuit board 38 may also include one or more tire parameter sensors 42 that detect one or more attributes such as tire location, temperature, air pressure inside the tire, tire wall stress, and/or other suitable parameters. The circuit board 38 may also include a power supply and microelectronics, including a transmitter for transmitting sensor data to a receiver located outside of the tire and wheel assembly 10. The circuit board configuration may be similar to that employed in a keyless entry system commonly used on motor vehicles.

The circuit board 38 may be disposed within a housing 44 that helps protect the circuit board 38 from environmental stresses including heat, humidity, damage, and caustic materials. The housing 44 may be made of any suitable material, such as a polymeric or metallic material. The housing 44 may have a cavity for receiving the circuit board 38. The circuit board 38 may be attached directly to the housing 44 or may be attached via an intermediate layer 46. For example, the circuit board 38 may be encapsulated in an intermediate layer 46 made of a polymeric material, acrylic, epoxy, putty, or other suitable material.

The housing 44 and/or the circuit board 38 may be attached to the bracket 28. In FIG. 4, the housing 44 is attached to the bracket 28 and the circuit board 38 is attached to the housing 44. The housing 44 may be attached to the bracket 28 using adhesives, fasteners, snap tabs, an interference fit, or other suitable attachment means. Alternately, the housing 44 may be hingedly attached to the bracket 28.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle tire monitoring system for use with a wheel that is configured to have a tire mounted thereon, the system comprising:
a sensor assembly mountable on the wheel, the sensor assembly including a first sensor for detecting a tire parameter and a second sensor for detecting proximity of the sensor assembly to the wheel based on the position of the second sensor relative to the wheel.

2. The vehicle tire monitoring system of claim 1 wherein the sensor assembly is disposed on the wheel using an adhesive.

3. The vehicle tire monitoring system of claim 1 wherein the first and second sensors are mounted on a circuit board.

4. The vehicle tire monitoring system of claim 1 further comprising a protective cover disposed around the first and second sensors.

5. The vehicle tire monitoring system of claim 1 wherein the sensor assembly is disposed on a drop center portion of the wheel.

6. The vehicle tire monitoring system of claim 1 wherein the second sensor is a hall effect sensor that detects detachment of the sensor assembly from the wheel based on the position of the second sensor relative to a magnet positionable proximate to the wheel.

7. The vehicle tire monitoring system of claim 6 wherein an insulator is disposed between the magnet and the wheel to inhibit demagnetization of the magnet.

8. The vehicle tire monitoring system of claim 7 wherein the sensor assembly further comprises a bracket for positioning the second sensor relative to the magnet.

9. The vehicle tire monitoring system of claim 8 wherein the bracket includes an aperture located between the second sensor and the magnet.

10. A vehicle tire monitoring system for use with a wheel that is configured to have a tire mounted thereon, the system comprising:
a sensor assembly mountable on the tire, the sensor assembly including a first sensor for detecting a tire parameter and a second sensor for detecting proximity of the sensor assembly to the tire based on the position of the second sensor relative to the tire.

11. The vehicle tire monitoring system of claim 10 wherein the sensor assembly is disposed on the tire using an adhesive.

12. The vehicle tire monitoring system of claim 10 wherein the first and second sensors are mounted on a circuit board.

13. The vehicle tire monitoring system of claim 10 further comprising a protective cover disposed around the first and second sensors.

14. The vehicle tire monitoring system of claim 10 wherein the second sensor is a hall effect sensor that detects detachment of the sensor assembly from the tire based on the position of the second sensor relative to a magnet positionable proximate to the tire.

15. The vehicle tire monitoring system of claim 14 wherein an the magnet is disposed on the tire using an adhesive.

16. The vehicle tire monitoring system of claim 14 wherein the sensor assembly further comprises a bracket for positioning the second sensor relative to the magnet.

17. The vehicle tire monitoring system of claim 16 wherein the bracket includes an aperture located between the second sensor and the magnet.

18. A system for monitoring a pneumatic tire disposed on a vehicle wheel, wherein the pneumatic tire and the vehicle wheel cooperate to define a chamber surface, the system comprising:
a magnet disposable on the chamber surface; and
a sensor assembly disposable on the chamber surface proximate to the magnet, the sensor assembly including a pressure sensor for sensing air pressure in the tire and an attachment sensor;
wherein the attachment sensor is configured to detect attachment of the sensor assembly to the chamber surface based on the position of the attachment sensor relative to the magnet.

19. The system of claim 18 wherein the sensor assembly further comprises a housing that receives the attachment sensor and the pressure sensor.

20. The system of claim 19 wherein the housing is disposed on a bracket attached to the chamber surface.

* * * * *